United States Patent [19]

Salisbury, Jr. et al.

[11] Patent Number: 4,635,479
[45] Date of Patent: Jan. 13, 1987

[54] FORCE SENSING APPARATUS

[75] Inventors: John K. Salisbury, Jr., Cambridge; David L. Brock, Lexington, both of Mass.

[73] Assignee: Massachusetts Institute of Technology, Cambridge, Mass.

[21] Appl. No.: 819,462

[22] Filed: Jan. 15, 1986

Related U.S. Application Data

[63] Continuation of Ser. No. 645,495, Aug. 29, 1984, abandoned.

[51] Int. Cl.$^4$ .............................................. G01L 5/16
[52] U.S. Cl. .................................................. 73/862.04
[58] Field of Search .......... 73/862.04, 862.05, 862.06, 73/170 A, 188, 189

[56] References Cited

U.S. PATENT DOCUMENTS

| | | | |
|---|---|---|---|
| 3,427,875 | 2/1969 | Saxl | 73/862.04 |
| 3,628,394 | 12/1971 | Keatinge et al. | 74/471 |
| 3,657,475 | 4/1972 | Peronneau | 178/18 |
| 3,798,370 | 3/1974 | Hurst | 178/18 |
| 4,121,049 | 4/1977 | Roeber | 178/18 |
| 4,220,815 | 9/1980 | Gibson | 178/18 |
| 4,319,766 | 3/1982 | Corteg et al. | 73/862.04 |
| 4,340,777 | 7/1982 | DeCosta | 178/18 |
| 4,355,202 | 10/1982 | DeCosta | 178/18 |
| 4,389,711 | 6/1983 | Hotta | 354/556 |
| 4,498,348 | 2/1985 | Wesson | 73/189 |

FOREIGN PATENT DOCUMENTS

0108348A3 10/1982 European Pat. Off. .
2096777A 10/1982 United Kingdom .

OTHER PUBLICATIONS

Hopley et al., Journal of Physics E: Scientific Instruments, 1971, vol. 4, pp. 489–494.
Von Armin Jossi, "Kraftsensoren fur Industrieroboter", Technische Rundschau, Nr. 45, 1983, (Bern, CH) p. 13.
W. Close et al, "Mobile Dynamometer for Tires . . . ", Research Trends, Buffalo, New York, vol. 4, No. 2, (1956).
Brendel, Albert E. "The Structures of Strain Gauge Transducers: An Introduction", IEEE Transactions of Industry and General Applications, vol. IGA-5, No. 1, (Jan./Feb. 1980).

Primary Examiner—Donald O. Woodiel
Attorney, Agent, or Firm—Hamilton, Brook, Smith & Reynolds

[57] ABSTRACT

Force sensing apparatus for determining the location, magnitude and direction of a force on a three dimensional surface in which there is a convex surface (10–12) of known configuration mounted on a pedestal 22. A cruciform load cell (16) equipped with strain gauges (60–62) measures forces applied to the convex surface through the medium of a flexible force transmitter member (64).

16 Claims, 7 Drawing Figures

FIG. 1 WRENCH SYSTEMS PRODUCED BY A POINT CONTACT
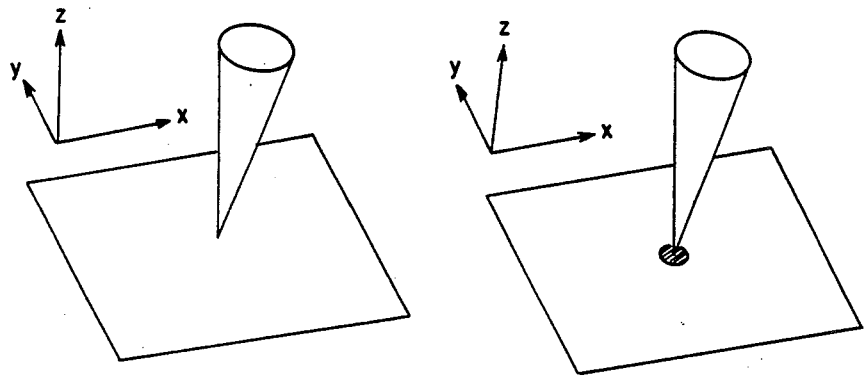
POINT CONTACT ON A FRICTIONLESS SURFACE. $w = w(0, 0, w_3, 0, 0, 0)$
POINT CONTACT ON A FRICTIONAL SURFACE. $w = (w_1, w_2, w_3, 0, 0, 0)$
FIG. 2 WRENCH SYSTEMS PRODUCED BY A LINE AND A PLANAR CONTACT
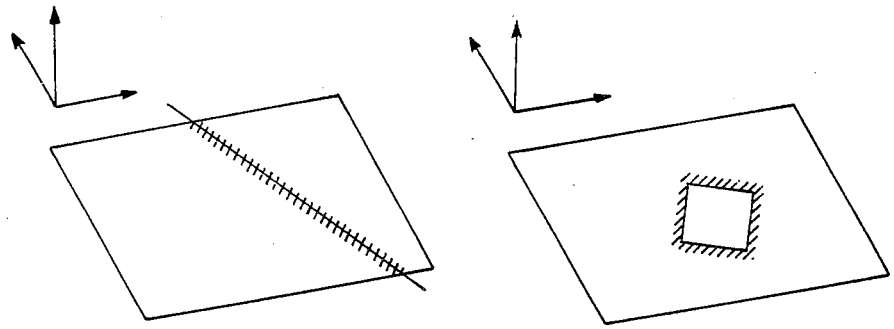
LINE CONTACT ON A FRICTIONAL SURFACE $w = (w_1, w_2, w_3, w_4, 0, w_6)$
AREA CONTACT ON A FRICTIONAL SURFACE $w = (w_1, w_2, w_3, w_4, w_5, w_6)$
FIG. 3 A POINT FORCE EXERTED ON THE SURFACE OF A SPHERE
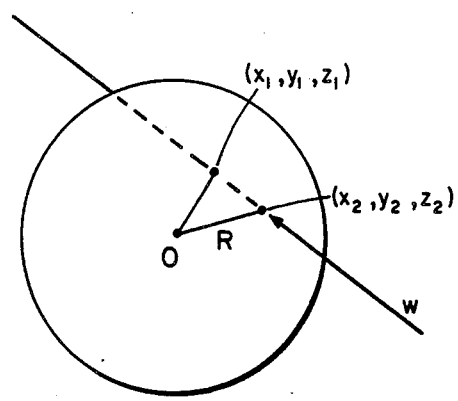

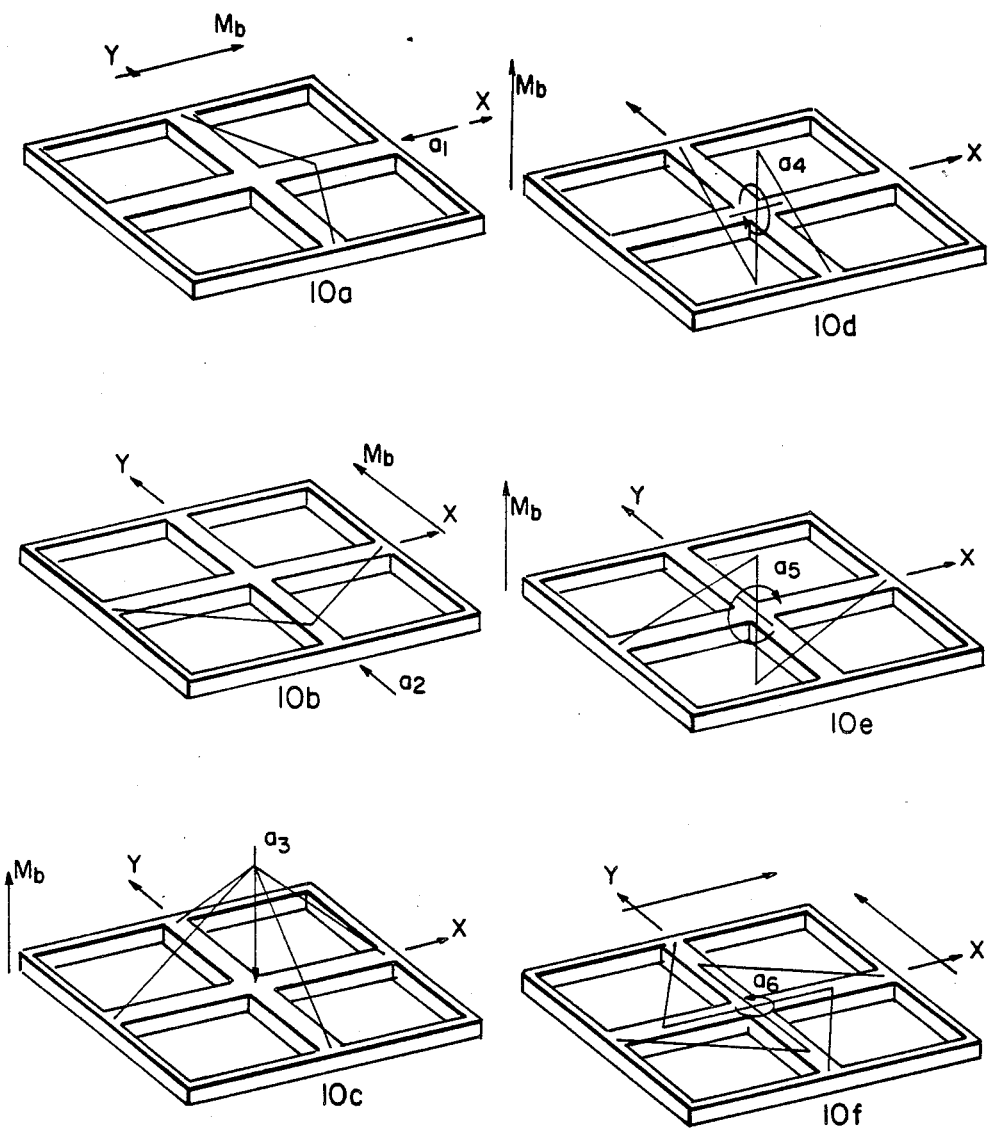
FIG. 6 BENDING MOMENT DIAGRAMS FOR LEGS OF THE MALTESE CROSS UNDER VARIOUS LOADINGS

FORCE SENSING APPARATUS

This is a continuation of co-pending application Ser. No. 645,495 filed on Aug. 29, 1984, now abandoned.

FIELD OF THE INVENTION

This invention relates to force sensing apparatus which will determine the location, magnitude as well as the direction of a force and which apparatus has particular application in the field of robotics.

BACKGROUND OF THE INVENTION

Robots are, at a very rapid pace, becoming increasingly more important in todays technology as responsive tools performing programmed functions. However, robots are not particularly sensitive to the environments in which they perform. For example, the ability of robots, in their present state of development, to touch and sense an object or a force and report back with reliability, the location, magnitude and direction of the force application of what it has touched, does not exist. This problem has received considerable attention, resulting in touch sensors being developed for robotics as well as many other purposes, but to date they have not been particularly successful.

One of the objects of this invention is to produce a reliable touch sensor device suitable for use in a robot and which would meet the criteria of being able to determine location, magnitude and direction of a force it comes in contact with.

Another object of this invention is to produce a touch sensing device meeting the above criteria and which has the versatility for utilization not only in robotics but outside that field as well. For example, such devices have great potential as touch sensitive mechanics for computers and calculators, inter alia.

Position and force indicating systems are not new. Many involve echo signals, light beam interruptions, capacitance change, wire contact etc. As pointed out in prior art patents directed to this area, among the different position and or force indicating systems known heretofore, those which operate by the application of pressure applied to a point, the location and magnitude of which is to be determined, generally require a great number of pressure sensors fixedly secured to the surface where the position of the point is to be determined. Generally, the sensors positions correspond to predetermined points on said surface. The number of possible positions which can effectively be determined is then limited to the number of sensors the surface is able to carry.

Some of the systems referred to employed conductive wafers sandwiched between two layers of parallel wires laid at right angles to each other to form a $N \times N$ matrix of points which produced $N^2$ outputs. To achieve acceptable accuracy over an area as small as a four inch square, thousands of outputs were necessary.

The invention disclosed U.S. Pat. No. 3,657,475 to Peronneau addressed the problem of the excessive numbers of outputs by developing a position indicating system for determining the coordinates of a point on a two dimensional surface to which static force is applied. It comprised a rigid plate fixed to the surface by means of at least three spaced apart sensors. Each sensor delivered an output signal which was proportional to its distance from the point of application of the force. The signals were then processed in an electronic unit generating two voltages which represented the coordinates of the point of application of the force to the surface, as measured with reference to two axes determined by the three sensors.

While the Peronneau invention has been generally considered a pioneer in its field, it was limited by the fact that the input force had to be static and it measured only the coordinates of the point of force on a two dimensional surface and not the magnitude of the force but still was limited to a two dimensional surface.

The invention disclosed in U.S. Pat. No. 4,121,049 to Roeber addressed this problem and resulted in a system which measured both location and magnitude of the force. Roeber employed three spaced sensors, each of which delivered an output signal proportional to both the applied force and the coordinates of the force. The signals were fed into a processor which computed the force and its coordinates.

The present invention addresses itself to not only simultaneously determining the coordinates of a force and its magnitude, but its direction as well on a three dimensional surface.

DISCLOSURE OF THE INVENTION

The invention resides in force sensing apparatus which includes a convex surface of known configuration. A load cell comprising a cross having four equal length flexible arms with its center attached to a pedestal receives and measures strain resulting from a force applied to the convex surface. A flexible force transmitting member is attached symmetrically to the convex surface and the arms of the cross. At least two strain gauges are secured to each of the arms of the cross in planes normal to each other whereby the force applied to the convex surface and the resultant moments of that force are transmitted to the flexible arms resulting in strain measurable by the gauges. The gauges are connected to a computer which computes location, magnitude and direction of the force.

The flexible force transmitting member may be a frame surrounding the cross and having sides of equal length. The arms of the cross are attached to the mid points of the four sides of the frame and the four corners of the frame are attached to the convex surface.

The convex surface may be a hollow sphere having a pedestal passing freely into it and terminating substantially at its center. There may be means to limit the amount of motion of the sphere which therefore limits the amount of strain in the arms of the cross to prevent damage.

Each of the arms of the cross may be constructed to flex in two planes normal to each other and, in this case, strain gauge mechanism is associated with each plane to measure the stress transmitted to it.

DESCRIPTION OF THE DRAWINGS

FIGS. 1 through 3 are schematic diagrams describing a wrench system for force measurement.

FIG. 6 is a series of bending moment diagrams for the cruciform load cell.

BEST MODE OF CARRYING OUT THE INVENTION

Figure 4:
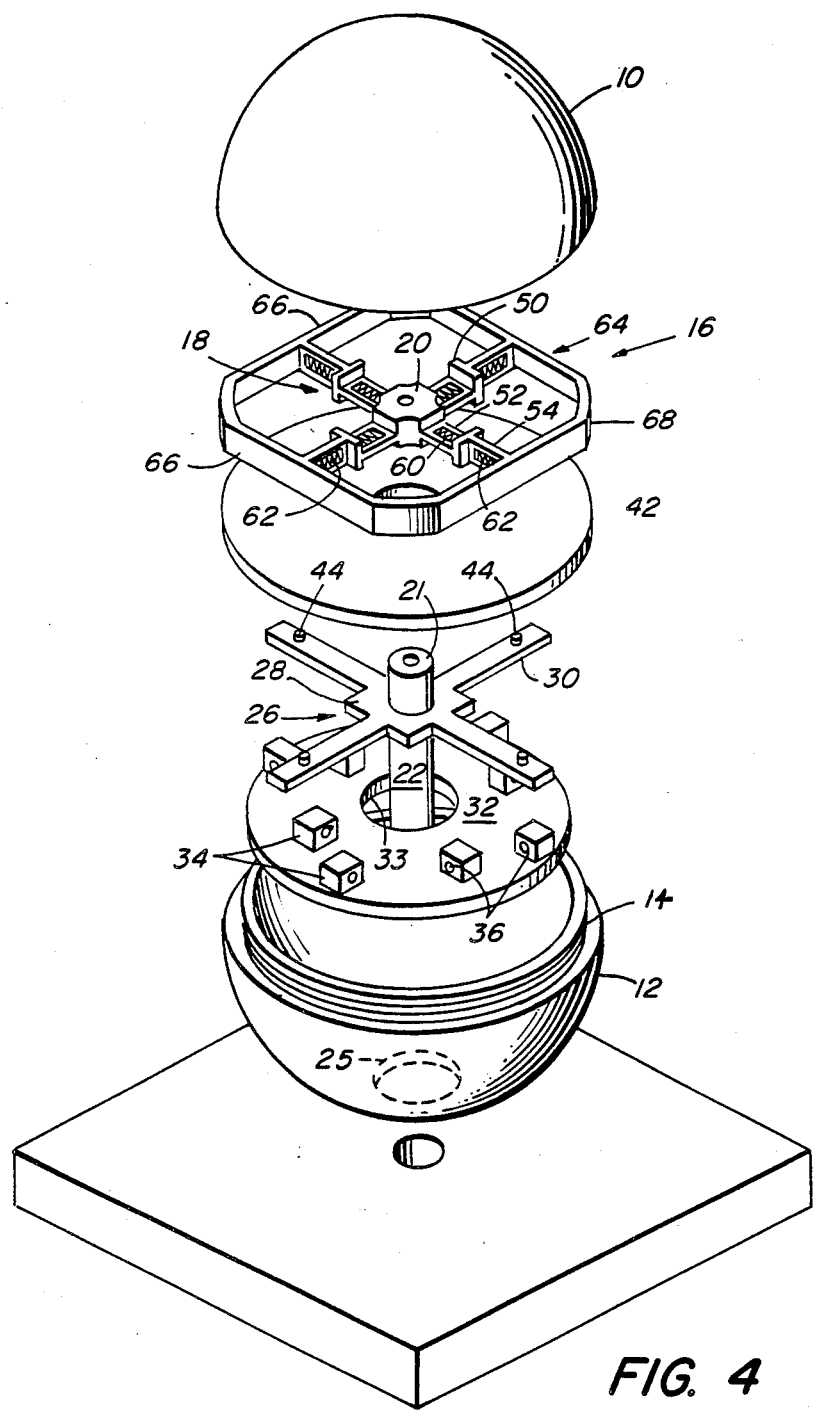
FIG. 4 is an exploded view of a four sensing apparatus embodying the features of this invention.
Figure 5:
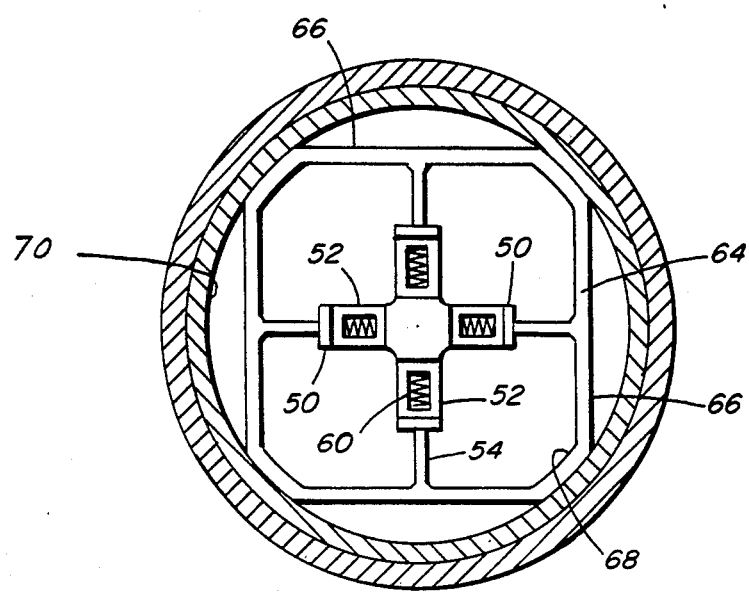
FIG. 5 is a plan view of a cruciform load cell employed in the apparatus.

In order better to understand the invention, a system of force measurement will now be described.

Reference is made to FIGS. 1 through 3 of the drawings. A set of forces and moments acting upon a body can be collectively called a wrench. The range of wrenches which may be exerted through a contact between two bodies can be described by a "wrench system." Such a wrench system is denoted by $w=(w_1,w_2,w_3,w_4,w_5,w_6)$, where $w_1,w_2$, and $w_3$ are the forces exerted along the x, y, and z axis respectively. Similarly $w_4$, and $w_5$, $w_6$ are the moments about the x, y, and z axis.

A point is shown contacting a plate in FIG. 1. If the surface is frictionless, the point can only exert a normal force. The wrench system is composed of a single wrench $w=(0,0,w_3,0,0,0)$. If the surface has friction the point can exert forces in all three directions and the wrench system becomes $(w_1,w_2,w_3,0,0,0)$, FIG. 2.

A line touching a friction surface can produce forces in all three directions and moments in two directions. The wrench system is, therefore, $(w_1,w_2,w_3,w_4,0,w_6)$, FIG. 2. A planar surface affixed to a plate can exert forces and moments in all directions resulting in a full wrench system $(w_1,w_2,w_3,w_4,w_5,w_6)$, FIG. 2.

The line of action and magnitude of a force exerted on the surface of a sphere can be determined knowing the forces and moments at the center of the sphere. A force is applied to the sphere at a point $x_2, y_2, z_2$, as shown in FIG. 3. As previously noted, a point force on a frictional surface can exert a wrench with three independent components, $w=(w_1,w_2,w_3,0,0,0)$, at the point of contact. This wrench system will cause the following system of forces and moments at the center of the sphere:

$$a_1 = w_1$$

$$a_2 = w_2$$

$$a_3 = w_3$$

$$a_4 = y_1 w_3 - z_1 w_2$$

$$a_5 = z_1 w_1 - x_1 w_3$$

$$a_6 = x_1 w_2 - y_1 w_1$$

Where $(x_1,y_1,z_1)$ are the components of a vector perpendicular to a line of action of the force from the origin of the sensing system to the line of action of the force. Using the above equation the point $(x_1,y_1,z_1)$ can be determined. To find the location contact is now determined by geometry. The line of action passes through the point $(x_1,y_1,z_1)$ and through the surface of the sphere. The coordinates of an arbitrary point along the force's line action will be, $$d_1 = x_1 + nw_1/F$$

$$d_2 = y_1 + nw_2/F$$

$$d_3 = z_1 + nw_3/F$$

where F is the magnitude of the force, $\sqrt{a_1^2 + a_2^2 + a_3^2}$ and n is any arbitrary number. The point $(x_2,y_2,z_2)$ lies the surface of the sphere, defined by $x^2+y^2+z^2=R^2$. If the point $(x_1,y_1,z_1)$, lies within the sphere, $x_1^2+y_1^2+z_1^2<R^2$, then the line of action of the force intersects the sphere at two points. The coordinates of the points $(x_2,y_2,z_2)$ are found by substituting the equation of the line of action into the equation of the sphere, $d_1^2+d_2^2+d_3^2=R^2$. Solving for the unknown variable n and substituting back into the equation will give the two points of intersection. If the force is assumed to be exerted into the sphere, not pulling on it, one of the points can be eliminated. The remaining point will be the coordinates of $x_2, y_2, z_2$.

Thus, the location, magnitude, and direction of a force exerted through a point contact can all be determined. Using geometric transformation, the force can be represented as a normal and a tangent force.

This can be particularly useful if a sphere or other convex surface of known configuration is to be used for robot fingertips. With this information, a robot finger could determine the normal and the frictional components of the contact force. This knowledge can be useful in control and shape recognition.

A force and tactile sensing apparatus embodying the features of this invention which was designed to perform in accordance with the above explained theory will now be described with reference to FIGS. 4 through 7.

A force is applied to a convex surface of known configuration which can be defined mathematically. For purposes of illustration that surface will be disclosed as a sphere, as seen in FIG. 4, which is an exploded view of the force sensing apparatus. The sphere comprises a top or "northern" hemisphere 10 and a lower or "southern" hemisphere 12. The hemispheres are machined from a solid piece of aluminum and are assembled by screwing them together. The lower hemisphere has threads 14 and the upper hemisphere has matching threads not seen. A load cell generally indicated 16, is located within the hollow sphere and is constructed in accordance with features of this invention to measure all six components of force and moment. The load cell has equal length arms and for illustrative purposes only is shown as a cruciform portion 18 but may have three arms or more than four. It will be described in greater detail hereinafter. The cruciform portion or cross is mounted at its center 20 on the upper surface 21 of a pedestal 22 which projects upwardly from a base 24 passing freely through a hole 25 in the lower hemisphere which is larger than the diameter of the pedestal.

A stop mechanism to limit the amount of motion of the sphere which therefore limits the amount of strain in the cross is located beneath the cruciform load cell and comprises a second cruciform member 26 having a central plate 28 firmly mounted on the pedestal 22 to prevent rotation. Extending outwardly from the plate 28 in a cruciform configuration are legs 30. Beneath the legs 30 is a plate 32 secured to the sphere and having a central aperture 33. Limit stops 34 are located on the plate 32 and, when in assembled configuration the legs 30 extend between adjacent pairs of stops 34. Set screws 36 in the stops 34 will engage the legs 30 to limit the twisting motion of the sphere about the pedestal.

A cover plate 42 is also secured to the inside of the sphere below the load cell and will engage set screws 44 extending upwardly from the cruciform legs 30 to limit the amount of movement of the sphere in the vertical direction so as not to overstrain the load cell.

The load cell comprises, in effect, a flexible cross located within a flexible force transmitting member, see FIG. 4. The center of the cross 18 is the hub 20 which is mounted to the top of the pedestal 22. Extending outwardly from the hub are arms 50 constructed to flex in two planes normal to each other. Each arm comprising a horizontal plate-like portion 52 and a vertical plate-like portion 54. Each portion 52 and 54 of each leg of the cross has a pair of strain gauges secured to it. A pair of gauges 60 are secured at opposite sides of the horizontal portion 52 and a pair of gauges 62 are located on opposite sides of the vertical portion of the arms 50. Thus, there are two pair or four strain gauges per leg, for a total of 16 gauges. In a more simplified version of the invention, two gauges per arm would suffice.

The pair of strain gauges 60 mounted on the top and bottom surfaces of the horizontal portions 52 measures strains from forces applied to the sphere in the vertical direction and the pair of strain gauges 62 mounted on the vertical portions of the legs 54 measures strains resulting from horizontally applied forces.

The flexible force transmitting member is a frame 64 attached symmetrically to both the sphere and the cross 18. It is illustrated as a square frame having sides 66 of equal length. The corners 68 of the square frame member are slightly rounded and are firmly secured to and fit within a retainer 70 attached to the sphere. The arms 50 of the cross are attached to the midpoint of the sides 66 of the frame.

A force applied to the sphere and the resultant moments of that force are transmitted through the square frame member to the arms 50, which strains are measurable by the strain gages. The load cell can measure all six components of force and moment at the center of the sphere.

Wires from the strain gauges are threaded through the cross, the pedistal and the base to a pin connector, not shown, located on the side of the base. From here the sensor is attached by a cable to a set of amplifiers and through a A/D converter to a computer which computes the location, magnitude and direction of the force.

Referring next to the schematic diagrams in FIG. 6, the bending moment in each of the arms of the cruciform load cell will now be described. The bending moment produces strain on the surfaces of the arms of the cross. The sum of the strains on the horizontal portions 52 of the arms, are proportional to the vertical force $a_3$ (FIG. 6c). The difference in the strains on the two opposing horizontal surfaces give the two moments $a_4$ and $a_5$ (FIGS. 6d & 6e). The sum of the strains on the sides of the opposing vertical portions 54 are proportional to the forces $a_1$ and $a_2$ (FIGS. 6a & 6b). Lastly, the moment $a_6$ is determined by the difference in strains on the vertical surfaces 54 of opposing legs of the cruciform load cell (FIG. 6f).

The summary of these relations are given in the following equation where $s_1$ to $s_8$ are strains and $k_1$ to $k_6$ are constants.

$$a_1 = k_1(s_6 + s_8)$$

$$a_2 = k_2(S_5 + S_7)$$

$$a_3 + k_3(S_1 + S_2 + S_3 + S_4)$$

$$a_4 = k_4(S_2 - S_4)$$

$$a_5 = k_5(S_1 - S_3)$$

$$a_6 = k_6((S_5 - S_7) + (S_6 - S_8))$$

Figure 7:
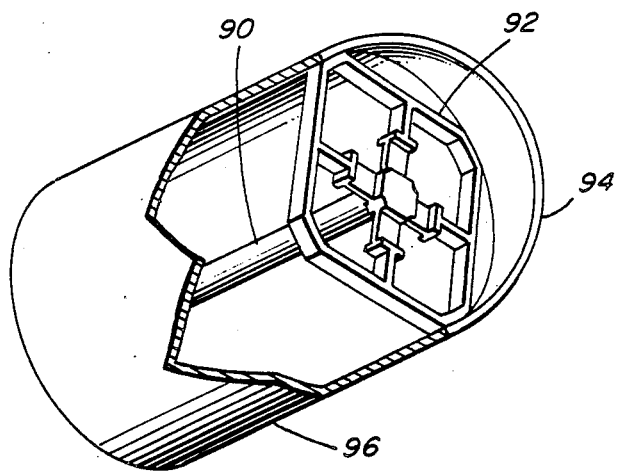
FIG. 7 is perspective view of an alternative embodiment of the invention.

Whereas the invention has been illustrated in apparatus having a sphere as the element to which the face is applied, this element may be any convex surface of known definable configuration. The configuration may even be two or more composite convex surfaces. Referring to FIG. 7 there will be seen a hypothetical robot finger having a pedestal 90, a cruciform load cell 92, a convex dome 94, of known definable configuration and a depending cylindrical skirt 96 also known definable configuration. In programming the computer, a definition of the convex surface (or surfaces) need only be inputed.

We claim:

1. Force sensing apparatus for determining the location, magnitude and direction of a force exerted through a point contact on a three dimensional surface comprising:
   a movable member having a convex surface of known configuration,
   a pedestal,
   a cross having flexible arms fixed to the pedestal,
   a flexible force transmitting member surrounding and attached to each arm, limited portions of the force transmitting member being attached to the movable member, the remainder of the force transmitting member being spaced from the movable member,
   at least one strain gauges secured to each arm of the cross whereby a force applied to the convex surface through a point contact and the resultant moments of that force are transmitted through the flexible force transmitting member to the flexible arms resulting in strain measurable by the gauges.

2. Force sensing apparatus according to claim 1 wherein there are means to limit the amount of strain transmitted to the arms.

3. Force sensing apparatus according to claim 1 wherein each arm is constructed to flex in two planes normal to each other and wherein strain gauge mechanism is associated with each plane to measure the strain transmitted to it.

4. Force sensing apparatus according to claim 1 wherein the strain gauges are connected to a computer which computes the location, magnitude and direction of the force.

5. Force sensing apparatus for determining the location, magnitude and direction of a force exerted through a point contact on a three dimensional surface comprising:
   a movable member having a convex surface of known configuration,
   a pedestal,
   equal length flexible arms with their center fixed to the pedestal,
   a flexible force transmitting member substantially surrounding the equal length arms and having the same number of sides as there are arms, the arms being attached symmetrically to the sides of the force transmitting member and the corners of the force transmitting member being symmetrically attached to the movable member,
   at least two strain gauges secured to each arm whereby a force applied to the convex surface through a point contact and the resultant moments of that force are transmitted to the flexible arms resulting in strain measurable by the gauges.

6. Force sensing apparatus according to claim 5 wherein there are means to limit the amount of strain transmitted to the arms.

7. Force sensing apparatus according to claim 5 wherein each arm is constructed to flex in two planes normal to each other and wherein strain gauge mechanism is associated with each plane to measure the strain transmitted to it.

8. Force sensing apparatus according to claim 5 wherein the strain gauges are connected to a computer which computes the location, magnitude and direction of the force.

9. Force sensing apparatus for determining the location, magnitude and direction of a force exerted through a point contact on a three dimensional surface comprising:
   a movable member having a convex surface of known configuration,
   a pedestal,
   a cross having equal length flexible arms with its center fixed to the pedestal,
   a flexible force transmitting frame surrounding the cross and having sides of equal length,
   the arms of the cross being attached to the mid points of four of the sides of the frame and four corners of the frame being attached to the movable member,
   at least one strain gauge secured to each arm of the cross,
   whereby a force applied to the sphere through a point contact and the resultant moments of that force are transmitted to the flexible arms resulting in strain measurable by the strain gauges.

10. Force sensing apparatus according to claim 9 wherein there are means to limit the amount of strain transmitted to the arms.

11. Force sensing apparatus according to claim 9 wherein each arm is constructed to flex in two planes normal to each other and wherein strain gauge mechanism is associated with each plane to measure the strain transmitted to it.

12. Force sensing apparatus according to claim 9 wherein the strain gauges are connected to a computer which computes the location, magnitude and direction of the force.

13. Force sensing apparatus for determining the location, magnitude and direction of a force exerted through a point contact on a three dimensional surface comprising:
   a hollow sphere;
   a pedestal passing freely into the sphere and terminating substantially at its center;
   a cross having equal length flexible arms within the sphere with its center fixed to the pedestal,
   a flexible force transmitting frame surrounding the cross and having sides of equal length,
   the arms of the cross being attached to the mid points of four of the sides of the frame and four corners of the frame being attached to the sphere,
   at least two strain gauges secured to each arm of the cross,
   whereby a force applied to the sphere through a point contact and the resultant moments of that force are transmitted to the flexible arms resulting in strain measurable by the strain gauges.

14. Force sensing apparatus according to claim 13 wherein there are means to limit the amount of strain transmitted to the arms.

15. Force sensing apparatus according to claim 13 wherein each arm is constructed to flex in two planes normal to each other and wherein strain gauge mechanism is associated with each plane to measure the strain transmitted to it.

16. Force sensing apparatus according to claim 13 wherein the strain gauges are connected to a computer which computes the location, magnitude and direction of the force.

* * * * *